Patented Apr. 2, 1940

2,195,595

UNITED STATES PATENT OFFICE 2,195,595

STABLE-VITAMIN-CONTAINING THERAPEUTIC PREPARATION

Ferdinand W. Nitardy, Brooklyn, N. Y., assignor to E. R. Squibb & Sons, New York, N. Y., a corporation of New York No Drawing. Application November 7, 1936, Serial No. 109,758

4 Claims. (Cl. 167—81)

This invention relates to vitaminic therapeutic and alimentary preparations, and has for its object the provision of methods and means whereby such preparations may be stabilized against loss of potency.

On account of their lability in the presence of air, it was proposed to protect vitaminic substances—including the liver oils of such fishes as the halibut, swordfish, tuna, and salmon, concentrates thereof, the germ oils of such cereals as wheat, and irradiated ergosterol and cholesterol—by incorporating them into fatty materials (which term, as used herein, embraces fats and oils and edible higher alcohols, especially sterols, preferably solid at room temperature and fusible at body temperature, among them cocoa butter and propylene glycol stearate); but even when thus protected (i. e., by envelopment and dilution of the vitaminic substance), the preparations continued to lose potency. It was then found that the acids produced by the rancidification of the fatty material accelerated the deterioration of the vitamins and tended to negative the protective action of the fatty material.

In the practice of this invention, therapeutic and alimentary preparations comprising fatty materials into which vitaminic substances have been incorporated are stabilized by mixing an alkaline substance therewith. Among the alkaline substances suitable for the purposes of this invention are the oxides and hydroxides, and the carbonates and other alkaline salts, of the alkaline-earth and alkali metals and of ammonia and its derivatives.

Preparations of the invention may be compounded by any of the known processes; and appropriate auxiliary dietary factors, medicines, absorbent carriers (e. g. calcium salts), excipients, sweetening and flavoring agents, antioxidants, and other ingredients may of course be included.

Example 1

| | | |
|---|---|---|
| Dicalcium phosphate | grams | 640 |
| Calcium gluconate | do | 960 |
| Powdered sugar | do | 400 |
| Sodium carbonate | do | 25 |
| Water | cc | 420 |

The dicalcium phosphate and the calcium gluconate are separately granulated with the aid of the sugar and water, the sodium carbonate being dissolved in the portion of the water used to granulate the calcium gluconate. The granulations are then dried, milled to a uniform size, mixed, and the mixture evacuated (to remove occluded air), whereupon (a) the mixture of granulations, preferably while still under vacuum (to facilitate penetration of the solution), is treated with a vitaminic substance, such as the liver oil of the halibut, swordfish, tuna, or salmon, wheat-germ oil, or a concentrate thereof, or irradiated ergosterol or cholesterol, or mixtures of two or more of these, preferably dissolved in a melted fat, and mixed with a small amount (0.5% to 2.0% of the fat used) of an alkaline substance such as magnesium oxide, magnesium hydroxide, calcium oxide, calcium hydroxide, or sodium carbonate; or (b) the mixture of granulations, preferably while still under vacuum, may have a solution of one or more of these vitaminic substances (dissolved in a volatile solvent, such as ether, which is subsequently evaporated off) poured over it and, together with one of the above-named alkaline powders, the ingredients may be well mixed in order to distribute the vitaminic substance and the powder uniformly over the granules. The finished granulation may be packaged and/or consumed, or tablets may be prepared therefrom in accordance with standard pharmaceutical procedures.

Example 2

About 0.75 g. of irradiated ergosterol, or an equivalent amount of irradiated cholesterol, is dissolved in 2.5 kg. of melted cocoa butter to which a small amount (0.5% to 2.0% of the cocoa butter) of one of the alkaline substances enumerated in Example 1 has been added; or the irradiated sterol may be dissolved in corn oil or other suitable solvent and the solution stirred into the melted cocoa butter to which a similar amount of an alkaline substance has been added, the solvent, if volatile, being permitted to evaporate while the mixture cools. Pellets of about 0.5 g. each may be formed (as by extrusion) from the mass, or the mass may be granulated and filled into ordinary gelatin capsules.

Example 3

| | Grams |
|---|---|
| Solid-fat solution of fish-liver oil | 20 |
| Wheat germ | 980 |

One part of a mixture of halibut and tuna liver oils, together with 0.3% of hydroquinone, is dissolved in 9 parts of cocoa butter; a small amount (0.5 to 2.0% of the cocoa butter) of magnesium oxide is added; and the mixture is chilled and granulated. These granules are thoroughly mixed with the wheat germ to form a relatively stable food product rich in vitamins A, B, D, and G.

It is to be understood that the foregoing examples are merely illustrative and by no means limitative of the invention, which may be variously otherwise embodied—as with respect to the specific alkaline substances, fatty materials, and other ingredients, and procedures—within the scope of the appended claims.

I claim:

1. A stable protected-vitamin-containing therapeutic or alimentary preparation essentially comprising an intimate admixture of a solid solution of a fat-soluble vitaminic substance in a solid fatty material with an alkaline substance.

2. A stable protected-vitamin-containing therapeutic or alimentary preparation essentially comprising an intimate admixture of a solid solution of a vitaminic fish-liver oil in a solid fatty material with an alkaline substance.

3. A stable protected-vitamin-containing therapeutic or alimentary preparation essentially comprising an intimate admixture of a solid solution of a vitaminic fish-liver oil in cocoa butter with magnesium oxide.

4. A stable protected-vitamin-containing therapeutic or alimentary preparation essentially comprising an intimate admixture of a solid solution of irradiated ergosterol in cocoa butter with an alkaline substance.

FERDINAND W. NITARDY.